Sept. 19, 1967 W. E. DAVIS 3,342,353
TOBACCO HARVESTER AND CLIP
Filed Dec. 28, 1964 5 Sheets-Sheet 1
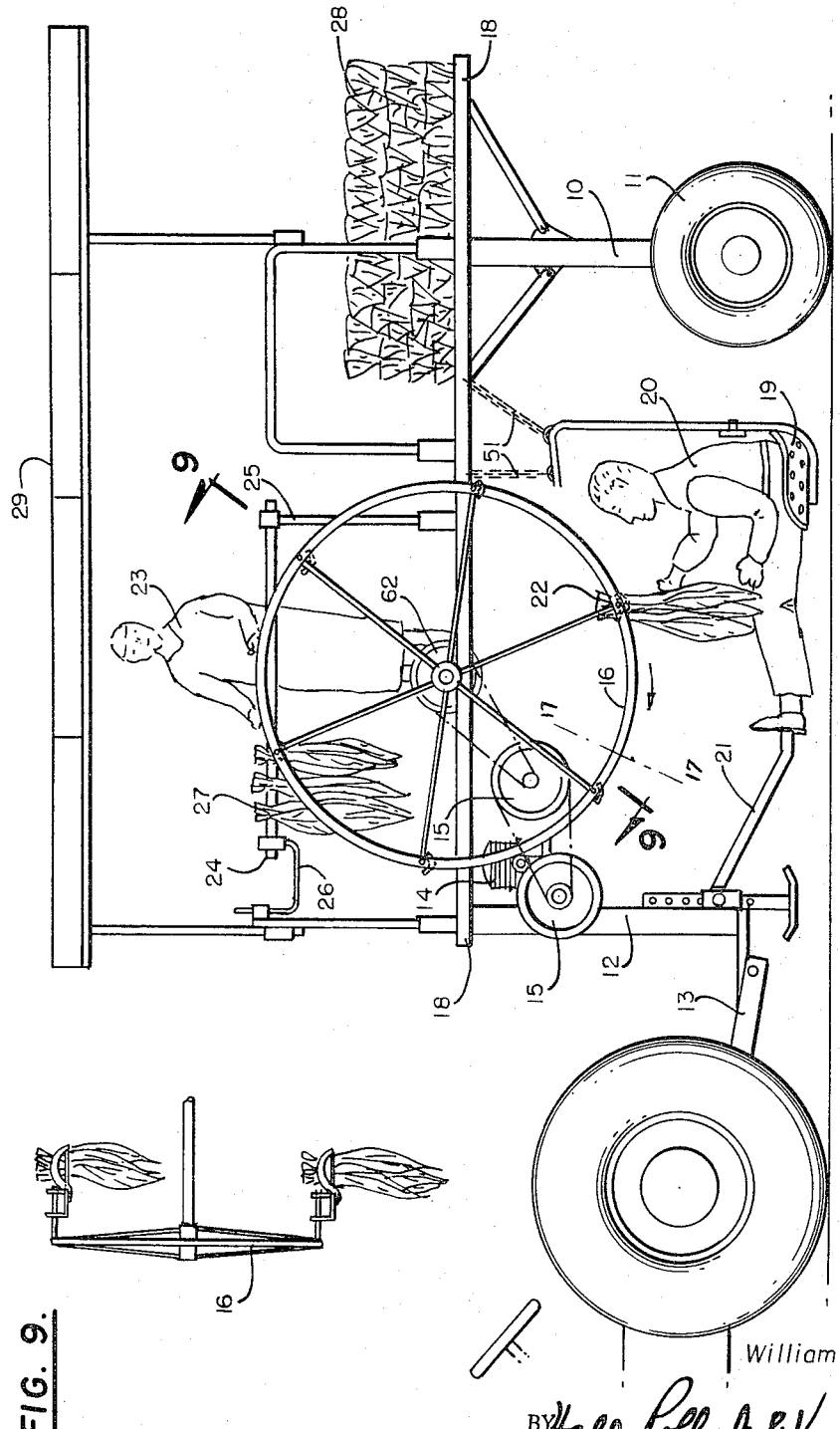
INVENTOR
William E. Davis
BY Hall, Pollock & Vande Sande
ATTORNEYS

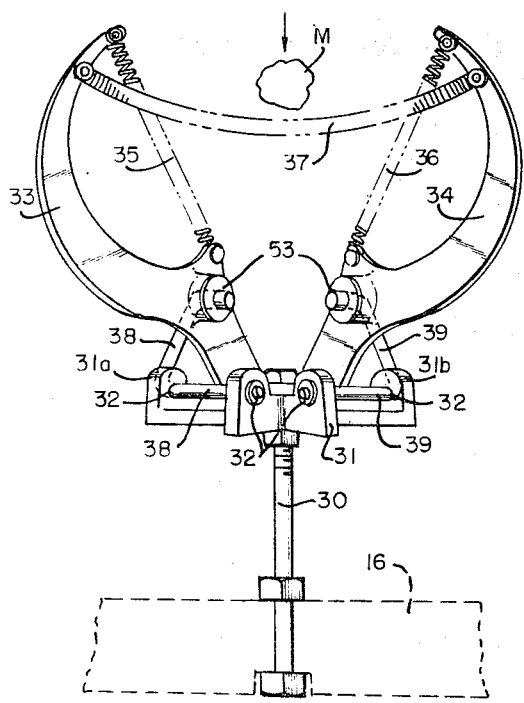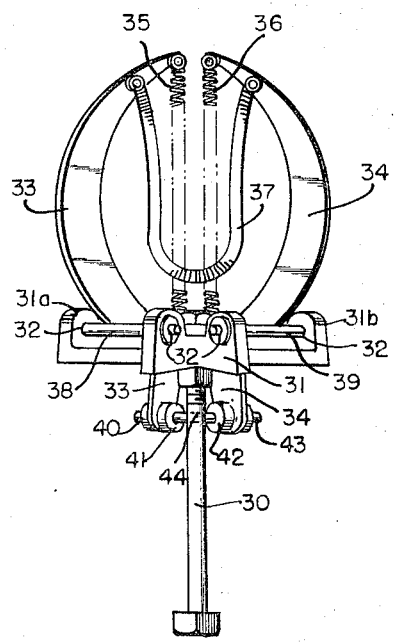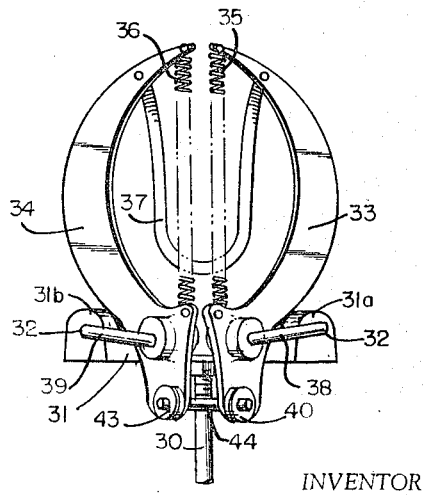

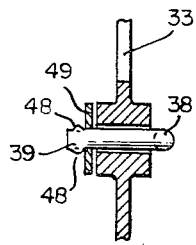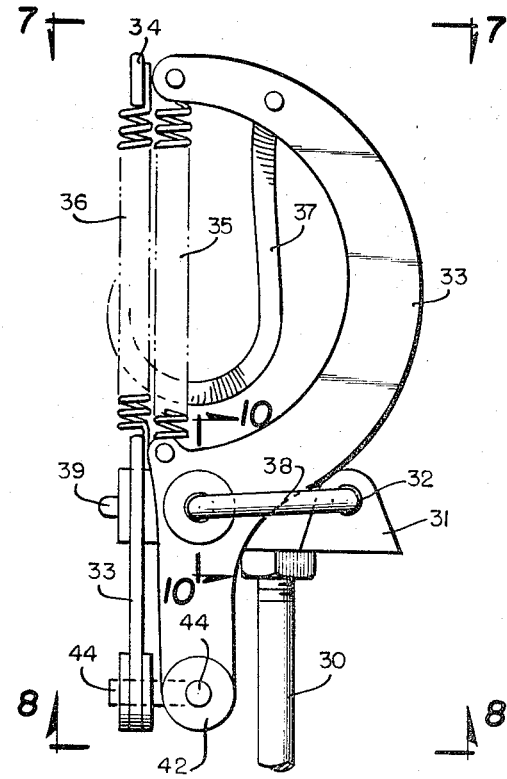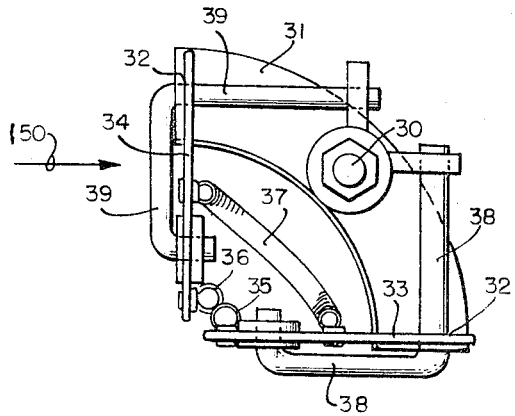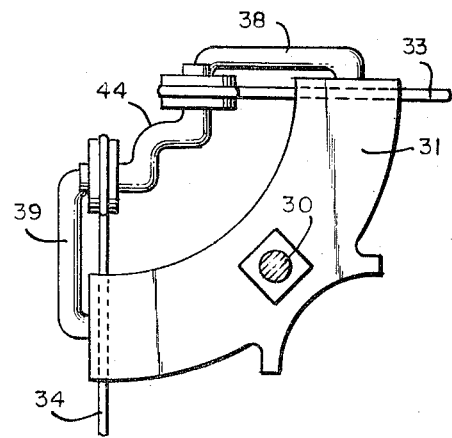

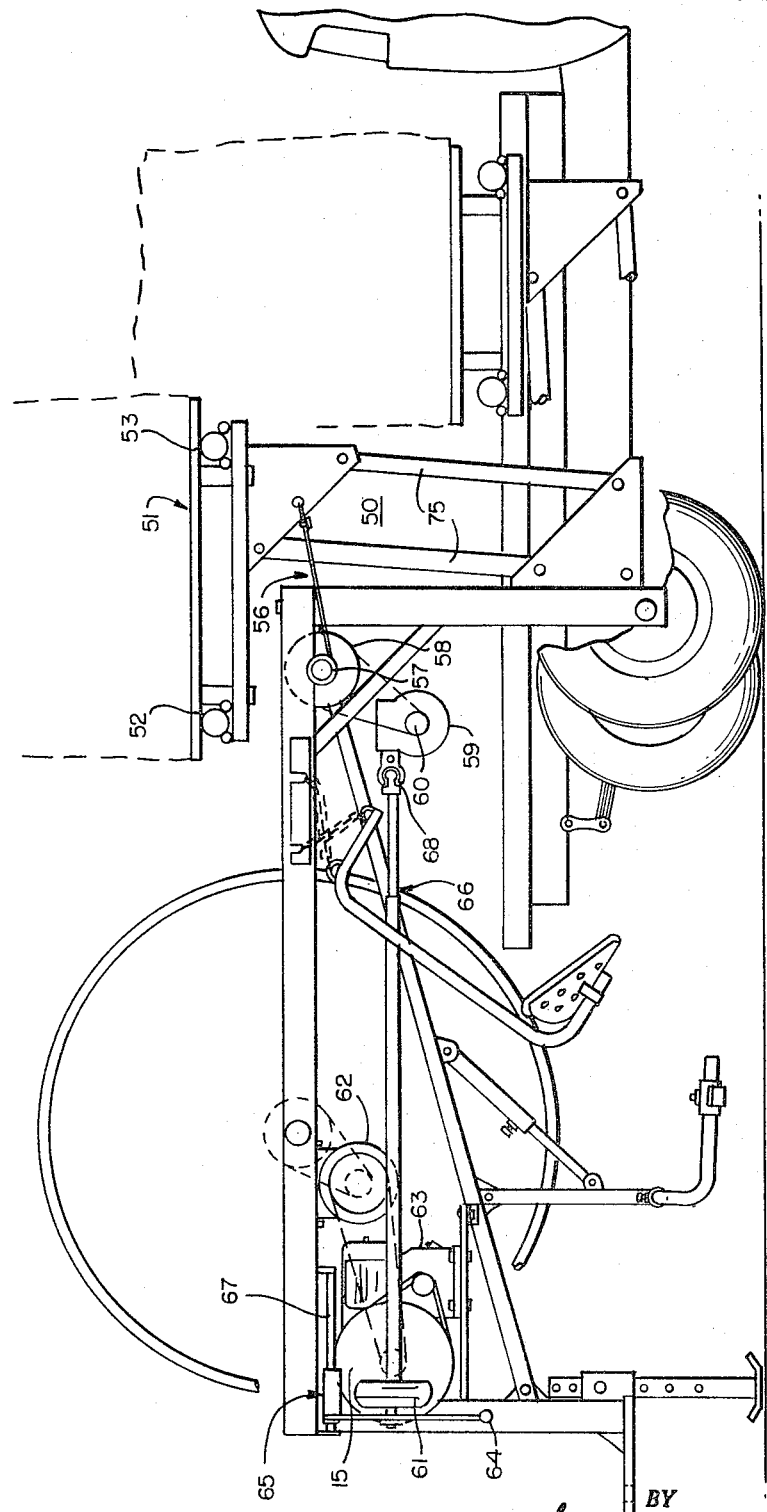

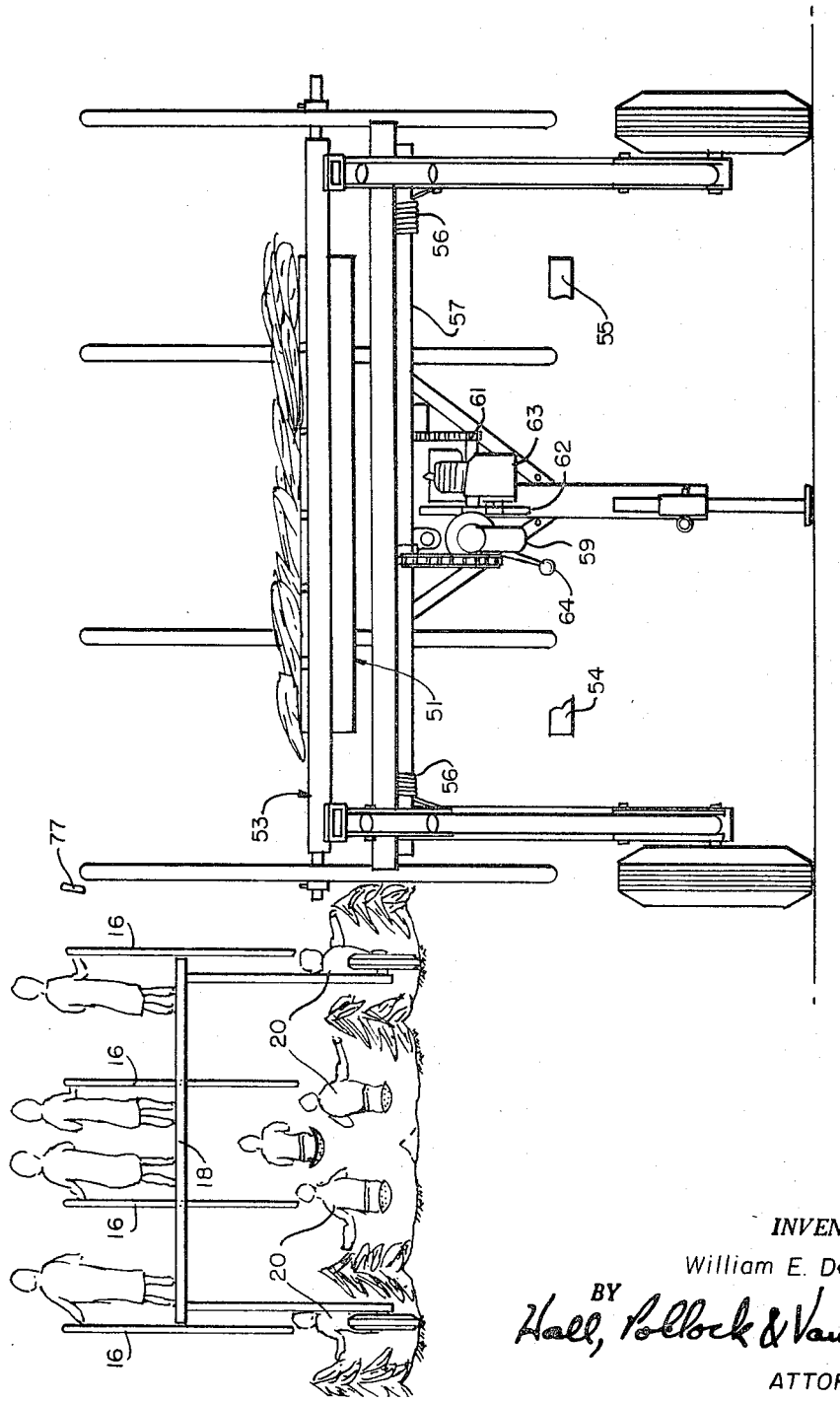

United States Patent Office 3,342,353
Patented Sept. 19, 1967

3,342,353
TOBACCO HARVESTER AND CLIP
William E. Davis, Seven Springs, N.C. 28578
Filed Dec. 28, 1964, Ser. No. 421,236
24 Claims. (Cl. 214—38)

This invention in one aspect relates to a tobacco harvester and in another aspect relates to a material-handling device such as, for example, a clip, useful in connection with conveyors including the conveyors on tobacco harvesters.

Tobacco harvesters, in one form, utilize a frame mounted on wheels that moves down through rows of tobacco and includes seats for leaf pickers. A conveyor runs from a position adjacent said seats to a position above a platform on which the tobacco is removed from the platform and stored. The present invention relates to an improved tobacco harvester of this general type and has for its primary object to provide improved means for receiving the tobacco leaves and conveying them to personnel on the platform.

Another object of the invention is to provide an improved material-handling device, for example, a clip. Other objects and advantages of the invention will appear as this description proceeds.

My improved tobacco employs wheels on opposite sides of the harvester, and these wheels being equipped with a plurality of outwardly extending clips. As a clip passes the leaf picker he inserts tobacco leaves in the clip and the leaves are transported to a position above the platform where they are removed by personnel working on the platform. While roughly similar arrangements have been made in the past using conveyor chains, my improvement consists in the application of a wheel to this type of machine, as well as the relative location of the wheel to the tobacco picker.

Another aspect of the invention resides in the particular form of clip which is used on the wheel. This clip has jaws which are biased to an open position by a main spring (hereinafter referred to as the first spring). Each jaw includes a spring of its own and it is these latter springs (hereinafter referred to as second and third springs) which hold the tobacco leaves or other material in the clip when it is closed. When the material to be held by the clip is inserted therein, it engages the said first spring and closes the jaws which are locked by locking mechanism associated with the jaws, whereby the material is held by the second and third springs.

In the drawings:

FIGURE 1 is a side view of a tobacco harvester embodying my invention.

FIGURE 2 is a top view of a clip embodying my invention, the clip being in an open position.

FIGURE 3 is a top view of the clip of FIGURE 2, except in the closed position.

FIGURE 4 is a bottom view of the clip of FIGURE 2, in the open position.

FIGURE 5 is a bottom view of the clip of FIGURE 2, in the closed position.

FIGURE 6 is a side elevation view of the clip of FIGURE 2.

FIGURE 7 is a front view of the clip of FIGURE 2, taken along the lines 7—7 of FIGURE 6.

FIGURE 8 is a rear view (looking from the conveyor outwardly) of the clip of FIGURE 2.

FIGURE 9 is a detailed view of the wheel 16 of FIGURE 1, as taken along the line 9—9 of that figure.

FIGURE 10 is a detail view of the ends of the rods 38, 39 and 44.

FIGURE 11 is a side view of the harvester showing a lift which may be added thereto, and showing a truck positioned to receive the tobacco stored on the lift.

FIGURE 12 is a rear view of the harvester showing the details of the lift and with some other details of the harvester omitted.

FIGURE 13 is a rear view of the harvester with the details of the harvester per se shown without the lift.

The tobacco harvester of FIGURE 1 includes a main frame with a rear frame portion 10 supported by a wheel 11. A front frame portion 12 is carried by a tractor 13. An engine of any suitable type 14 operating through several pulley and belt devices 15 and 62, which rotates the main conveyor wheels 16 preferably in a clockwise direction at a speed which is adjustable. Located at equally spaced intervals around the wheel, there is a clip of the type shown in FIGURE 2, this clip being affixed rigidly to the wheel by means of a bolt 30, which does not change its position with respect to the wheel as the wheel rotates. When any given clip on the wheel passes imaginary line 17—17, the clip is in the position shown in FIGURE 2. In other words, FIGURE 2 shows the clip at line 17—17 when viewed from a position vertically above the clip. The same thing may be said in another way as follows: when one of the clips is at the location of clip 22 as shown on FIGURE 1 of the drawing, the leaf picker 20 would be looking at the clip along line 150 of FIGURE 7. The main frame includes a horizontal platform 18 from which is suspended a seat 19 on which the leaf picker 20 may sit. A suitable footrest 21 is provided. The seat 19 may be suspended from the frame 18 by means of suitable chains 51. One or more persons 23 may work on the platform 18. Upon this platform are located a suitable quantity of tobacco sticks, for example, stick 24 which may be placed in a horizontal operation position by means of stick supports 25–26. Tobacco that has been harvested may be placed on the platform at 28 in any suitable way, and a suitable roof 29 may be provided, if desired. It is understood that FIGURE 1 illustrates only one side of the machine, and that the opposite side of the machine is similarly provided with equivalent apparatus. The machine as a whole may have four leaf pickers 20, four wheels 16, as shown in FIGURE 13. The operation of the tobacco harvester of FIGURE 1 is as follows:

As the wheel 16 rotates clockwise, a suitable clip 22 (see FIGURES 2 to 8 for details) moves down past the forehead of the leaf picker into a position directly in front of the eyes of the leaf picker. He thereupon inserts into the clip 22 any suitable number of tobacco leaves as the wheel continues to rotate. Since there is a similar clip 22 at the end of each spoke of the wheel 16, another such clip will be readily available to the leaf picker 20 as soon as he has picked additional leaves of tobacco.

When the clips 22 have carried the leaves to a position within reach of the operator 23 on the platform 18, the latter operator removes the leaves, ties them, and places them on a tobacco stick 24 in the customary manner. After the clip 22 has been described in detail hereinbelow, I will explain the relative position of the clip and the wheel in additional detail.

Some of the advantages of the wheel-type harvester over the prior art harvester utilizing chains will now be explained.

The harvester of this invention employing the wheel instead of the chains as the conveyor, requires much less power to operate. In the prior art chain-type conveyors, the friction of the chains, sprockets and bushings, plus the friction resulting from dirt in the chains, is very substantial.

With the prior art type conveyor, there is considerable jerkiness and vibration causing tobacco to jerk out of the clip. The wheel-type machine of this invention conveys the tobacco smoothly and avoids drop-out as hereinbefore described.

In the prior art chain-type conveyors, operators frequently accidentally placed their fingers in the moving chains and sprockets with resultant injuries, including many lost fingers. In contrast, the wheel-type harvester of this invention is a safe piece of machinery.

With the prior art chain-type conveyor, considerable tobacco was lost due to the injury or else the harvester had to proceed slowly, since often tobacco leaves were blown across the path of the harvester. With the prior art harvester, this so-called "down tobacco" usually gets lost between the sprocket and chain or wheel and is mutilated. Sometimes it even throws the chain off the sprocket. In any case, the tobacco is damaged. In contrast, the present wheel-type conveyor embodying the present invention does not injure the "down tobacco." The large wheel 16 does not extend close enough to the ground to pick up the tobacco off the ground, and if the tobacco leaves are loosely lying on the tobacco plant, the rotation of wheel 16 simply passes over the tobacco without injuring it. Moreover, when harvesting in an area where there is a considerable amount of "down tobacco" to be encountered, the direction of rotation of wheel 16 may be reversed and the wheel operated at a speed so that its periphery is moving rearwardly (at the lowest point of the wheel) at substantially the same speed that the harvester is moving forward so that there is no scraping action between the wheel and any tobacco leaves that may be lying on tobacco plants that are in the path of the harvester.

The chain-type harvester must have constant greasing of the sprockets and chains to prevent wear. Invariably at some point along the line of travel some of the tobacco comes in contact with the chain and will have the imprint of the chain in grease on the tobacco. This has caused some tobacco to be down-graded. In contrast, the wheel-type conveyor of this invention keeps the tobacco leaves away from all grease.

The chain-type conveyor of this application has about one half of the parts found in the conventional tobacco harvester with chains. In a typical harvester of the present invention there are four wheels such as 16 on one shaft, and constitutes only one moving part as compared to the multitude of parts on the conventional machines. Hence there is a simplicity of operation, a simplicity of maintenance, less chance for breakdown, etc., with this machine, than with those of the prior art. It follows that this machine may be operated by semi-skilled and unskilled labor.

Referring to the clip of FIGURE 2, it has main jaw elements 33 and 34 held apart by a spring 37. It is a very important aspect of this invention that the spring 37 is under compression so that it is forcing the jaws 33 and 34 away from each other. This spring 37 is sometimes hereinafter referred to as the first spring. The jaws 33 and 34 respectively have second and third springs 35 and 36, the purpose of which is to hold any material that is clamped between the jaws. As shown in FIGURES 4, 5, 6 and 8, the inner ends of jaws 33 and 34 are pivoted to a floating rod 44, and the jaws 33 and 34 are supported at 90° to each other by rods 38 and 39 which are in turn supported by the frame 31, which is in turn supported by the main bolt 30. The rods 38 and 39 pass through and pivot about holes 32 in the frame 31, and constitute a locking mechanism, as will hereinafter be described. The jaw 33 includes bosses 40 and 41 which are integral therewith and through which the rod 44 passes. At the end of each of the rods 38, 39 and 44, there are suitable washers and in each case the end of the rod is enlarged in any suitable way as, for example, by a cotter pin so that the rod remains in place. The cotter pins or other enlargements at the end of each rod are not shown in FIGURES 2 to 8, inclusive; however, FIGURE 10 does show a typical termination of each end of each rod 38, 39 and 44.

The operation of the clip of FIGURES 2 to 8 inclusive will be described, as follows:

Assuming that a piece of material M, for example, one or more stems of tobacco leaves, are to be conveyed by the clip. The operator forces the material M against the spring 37, and presses the same inwardly toward the rod 30 until the pressure on the spring 37 causes the jaws 33 and 34 to snap closed. When this occurs, the springs 35 and 36 clamp the material M between these springs and hold it firmly. At the same time the jaws 33 and 34 move rearwardly (assuming we are looking at FIGURE 2 from the top), toward a lock position shown in FIGURE 3. In the locked position the rods 38 and 39 have rotated to a position where the holes 53 in the jaws 33 and 34 are rearward of the holes 32 in the frame 31, so that now the force of spring 37 on the jaws 33 and 34 locks the jaws closed instead of open. This is best illustrated in FIGURE 5 where it is apparent that any effort to move the jaws 33 and 34 away from each other also tends to rotate the rod 38 counterclockwise and rod 39 clockwise; but these two rods cannot rotate further in those directions for the reason that the rearward ends of jaws 33 and 34 are connected to each other by means of the rod 44 and the outer edges of jaws 33 and 34 have moved into engagement with bosses 31a and 31b respectively which extend outward from frame 31. Thus, the force of spring 37 has now locked the apparatus in the position of FIGURE 5.

One way to release the clip from its locked position is to simply pull outward on the tobacco stems in exactly the opposite direction from that in which the tobacco was inserted. Since the tobacco stems are being gripped by helical coil wire springs 35 and 36, the outward pull on the tobacco stems drags the entire movable assembly 33, 34 and 44 with them and rotates the arms 38 and 39 past their plane of instability (as more fully explained below) causing the jaws 33 and 34 to abruptly move to the open position. Partial grasping of the springs 35 and 36 helps removal of the tobacco without damage.

Another way to release the clip from the locked position of FIGURE 5 is to press forward on the rod 44, or on the rear ends of jaws 33 or 34, to a sufficient extent to rotate those portions of arms 38 and 39 which are shown in FIGURE 5, past the plane of instability, whereupon the spring 37 abruptly opens the jaws. The plane of instability may be readily understood from an examination of FIGURE 6, it being understood that it is reached when the arm 38 shown in that figure is horizontal. When the left end of the arm 38 of FIGURE 6 is below the right end thereof, the spring 37 effects the locking action described in connection with FIGURE 5, whereas when the left end of arm 38 (as shown in FIGURE 6) is above the right end of that arm, the spring 37 tends to open the jaws 33 and 34. Each of the springs 35, 36 and 37 is made of a helical coil of spring wire of suitable diameter.

Located at any desired elevated point adjacent the path of the wheel, a stationary projection 77 (FIGURE 12) carried by the frame may engage the rear end of the jaws 33, 34, and automatically open them.

If Sheet 3 of the drawing, which includes FIGURE 7, is turned at a 90° angle so that it is viewed from the left edge thereof, the clip of FIGURE 7, if open, will be in the position where the leaf picker will insert his leaves. When he inserts his leaves and the clip is closed, as shown in FIGURE 7, the wheel 16 rotates continuously. When it has rotated approximately 180°, the clip is now in a position as would appear if viewed from the right hand edge of Sheet 3 of the drawing, and the tobacco leaves will be hanging out the left side of the clip in a position readily available to the operator 23. As a consequence, the particular form of clip which I have just described is especially adapted for use in a tobacco harfor the reason that it permits the leaf picker 20 to insert the leaves at the most convenient angle, and it makes the leaves available to the operator 23 also at the most convenient angle. By having the jaws 33 and 34 in planes that are at an acute angle to each other (for example, the 90° angle shown), the tobacco leaves can hang more nearly vertical throughout most of their travel than would be the case if the jaws 33 and 34 were in the same plane.

The wheel type conveyors of this application avoid necessary brackets and posts that were normally used to support the chains and sprockets of prior art tobacco harvesters. Therefore, there is room under this harvester to back a conventional truck underneath the harvester to facilitate unloading. FIGURE 11 illustrates such a truck under the harvester. In order to transfer the tobacco from the harvester to the truck, a novel lift 50 is employed. This lift includes four pipe members 75 with brackets offset so that pallet member 51 can be located forward above the axle. The pallet 51 is a very simple structure and is eight feet long, which is the legal width of a motor truck. This pallet is supported on the left by two pipe members 52 and 53.

The truck body appears broken away in the form of a platform 54-55 in FIGURE 12 which shows the relative width and height of the truck body with respect to the dimensions of the harvester. It can be seen that when the pallet 51 comes in contact with the truck body, pipe members 52 and 53 may be removed from their sockets and the truck moved forward. With the truck out of the vester, particularly one with a rotating wheel as described, way, the pipe members are returned to their sockets and another pallet is installed and returned to the working position. The cycle may be repeated when the pallet is again filled with the harvested tobacco.

This harvester is the first from which it has been possible to load the eight-foot wide truck directly. It was necessary to re-design the whole machine to do it.

The lift is controlled by a cable 56 wrapped around the tubing 58 which carries sprocket 159. The latter is driven by a worm gear box 59 by means of a chain and sprocket 60. The worm gear box 59 is driven by a friction wheel 61 pressed against the face of the main drive pulley 15 by a spring. To operate the lift, the operator effects engagement of friction wheel 61 with pulley 15 by pressing handle 64. The pallet will move either up or down depending on whether or not a left or right hand worm is incorporated in gear box 59. To reverse the procedure, the friction wheel 61 is moved to the right of the center of pulley 15 and the handle 64 pressed to effect re-engagement thereof with pulley 15.

The friction wheel 61 has a shaft with a telescoping member 66 therein which enables the length of the shaft to be varied for the purpose of moving the friction wheel 61 along the horizontal diameter of pulley 15 as aforesaid. In addition this shaft has a universal joint 68 connecting the shaft to the gear box 59.

The handle 64 is connected to a sleeve 65 which may rotate on the axis of, or slide lengthwise of a stationary rod 67. Since the handle 64 includes a bearing surface which receives the shaft of friction wheel 61, it may be moved to effect engagement or disengagement of wheel 61 with pulley 15 as well as to move wheel 61 along the horizontal diameter of pulley 15.

FIGURE 13 shows that my novel harvester may have four wheels 16, one for each of four rows of tobacco, together wth four primers 20.

Instead of being pulled by a tractor, the harvester may be self-propelled according to the principles shown and explained in my prior U.S. Patent No. 2,715,968 granted Aug. 23, 1955, entitled "Tobacco Harvester."

I claim to have invented:

1. In a harvester, a frame having a front and a rear and also having wheels supporting the same for travel along the ground past the crops to be harvested, a forward facing crop-picker's seat carried by said frame and located adjacent the ground to support a crop-picker facing forwardly in the direction of travel of the frame, a raised platform carried by said frame at a level substantially above any crop-picker on said seat, a rotary element located in a generally vertical plane with its axis generally perpendicular to the path of travel of the frame, means mounting the center of said rotary element adjacent said platform and sufficiently spaced forwardly of said seat that the outer portion of the rotary element having a plurality of such outer portions at different angular positions about said axis, a plurality of crop-holding means carried respectively by said plurality of outer portions, at least some of said crop-holding means comprising clips, said clips each having two jaws the respective crop-holding portions of which consist of helical coil wire springs, the two springs of a pair of jaws moving to an adjacent parallel relation when the jaws are closed, the lower jaw being in a horizontal plane with its opening facing the crop-picker and the upper jaw in a vertical plane when the crop-holding means passes in front of the crop-picker, and means for rotating said rotary element in a direction which is clockwise when viewed toward that side of the harvester which is on the right of one facing the front of the harvester.

2. In a harvester as defined in claim 1, said clip including toggle means for opening and closing the same abruptly.

3. In a harvester as defined in claim 2, means for tripping the clip open when the clip reaches a predetermined raised location.

4. In a tobacco havester, frame means for moving along a row of tobacco plants, elevated means for receiving tobacco leaves, conveyor means for conveying tobacco leaves from a position adjacent the ground to a position at least adjacent to said elevated means, said conveyor means including a clip having jaws, toggle means for abruptly opening and closing the jaws, said toggle means including a spring extending from one jaw to the other across the path where tobacco stems are inserted for closing the jaws when tobacco stems are inserted in the clip, said spring normally biasing said jaws toward the open position when the jaws are open and toward the closed position when the jaws are closed.

5. In a tobacco harvester as defined in claim 4, each said jaw having a stem engaging portion consisting of a helical spring wire coil secured to the jaw only at its opposite ends.

6. A clip comprising first and second jaw members, toggle mounting means supporting one end of each jaw member leaving the other ends of the jaw members free to open and close, a spring having one end thereof connected to one of said jaw members and the other end thereof to the other jaw member and applying to each jaw member a force which is in a direction away from the other jaw member, said spring extending across the path of an object entering between the jaw members when they are open, said toggle mounting means locking said jaw members in open position when they are open and abruptly moving to a position locking the jaw members closed when the said spring is deflected by an object passing inwardly between the jaws.

7. A clip as defined in claim 6 in which the material engaging portion of each jaw member consists of a helical coil wire spring fastened at each end thereof to the jaw member.

8. In a clip, a frame, first and second members both of which are pivoted to the frame in a common plane and extend away from a first side of said plane when the clip is open and away from the second side of said plane when the clip is closed, first and second opposing jaws, each jaw extending transverse to said plane and having its respective ends on opposite sides of said plane, said first member being pivotally connected to said first jaw intermediate the ends thereof, said second member being pivotally connected to said second jaw intermediate the end thereof, a floating link pivotally connected to those ends of the jaws that are on the second side of said plane, and a spring connected at one end to one jaw and at the other end to the other jaw and located in the path of an object inserted between the jaws through the open end of the clip, said spring exerting a force on each jaw that is in a direction away from the other jaw, said first and second members being mounted for movements along respective paths that converge on each other when the clip is closed.

9. A clip comprising a frame, first and second members pivoted to the frame in a common plane and having outer end portions movable to either side of said plane, first and second opposing jaws each having an inlet end spaced away from said plane on one side thereof and each having a second end spaced away from said plane on the other side thereof, the outer end portion of the first member being pivotally connected to said first jaw intermediate its ends, the outer end portion of the second member being pivotally connected to said second jaw member intermediate its ends, a floating link pivotally connected to both of said jaw members, and a spring connected at one end to one jaw and at the other end to the other jaw and applying a force on each jaw in a direction away from the other jaw so that when the clip is open the spring tends to hold it open and when the clip is closed the spring tends to hold it closed, said spring being in the path of an object inserted into the inlet end of the clip and having a degree of flexibility that upon being deflected by the inward motion of such object will move the jaws inward until the outer end portions of said members pass to the second side of the plane in which condition said spring locks the clip closed, the first member along with the first jaw and the second member along with the second jaw being respectively mounted for movement along first and second paths that converge on each other when the clip is closed.

10. A clip as defined in claim 9 in which the first and second jaws are of substantially the same length, in which said first and second members are of substantially the same length and have their outer end portions pivotally respectively connected to the jaws at substantially the same distance from the second ends thereof.

11. A clip as defined in claim 10 in which the two jaws are mounted for movement in two different planes respectively both of which are perpendicular to said common plane and which are at a substantial acute angle to each other.

12. In a harvester, a frame adapted to travel over the ground along a path adjacent to the crop to be harvested, at least one rotary means carried by said frame and having a smooth, circular periphery, the plane of rotation of said rotary means being transverse to the ground, supporting means for supporting a crop picker adjacent the lower part of the path of travel of the outermost part of said rotatable means, crop-holding means carried by the rotatable means near the outermost part thereof, receiving station means for receiving the crop, said receiving station means located at level substantially higher than the said supporting means, rotating means for slowly rotating said rotary means about its axis so that a crop picker located on said support means may pick crops and deliver them to the crop-holding means and the rotary means will raise the crop-holding means with the crop held thereby to an elevated position for delivery to the receiving station means, and reversible drive means for turning said rotary means in either a clockwise or counter-clockwise direction whereby in normal operation the rotary means can be rotated in a direction in which the lower periphery of the rotary means is traveling toward the front of the harvester and when there is a considerable amount of "down tobacco" to be encountered the rotary means can be rotated in the opposite direction.

13. In a harvester as defined in claim 12, said rotating means including speed drive means for providing said rotary means with a peripheral speed equal to the forward speed of the harvester frame as it travels over the ground.

14. In a harvester as defined in claim 12, at least four rotary means all mounted on the same axis and rotated in unison.

15. In a harvester, a frame having a front and a rear and also having wheels supporting the same for travel over the ground along a path adjacent the crop to be harvested, rotary means of relatively large diameter as compared to said wheels and having the lowermost part of its path of rotation spaced substantially above the ground, mounting means carried by said frame mounting said rotary means for rotation about an axis that is transverse to the direction of travel of the frame and with the plane of rotation transverse to the ground, supporting means for supporting a crop-picker in a position so that he is facing forwardly and is located to the rear of as well as adjacent to the lower part of the path of travel of the rotary means, a crop-holding means mounted on the rotary means near the outermost part thereof, and rotation means for rotating said rotary means, a loading platform mounted on said frame and located at a level substantially higher than said supporting means and within the central area of said frame, said frame defining an area of clearance wide and large enough for a truck to be backed up in proximity to said loading platform and within a substantial portion of said frame, whereby tobacco placed on said loading platform may be easily and simply loaded onto said truck, said loading platform being capable of being raised and lowered with respect to said frame, parallel mounting means for mounting said loading platform substantially parallel to the ground when it is raised and lowered, said loading platform being mounted on said frame by said parallel mounting means, said parallel mounting means comprising at least one set of two support members rotatably connected to directly opposing portions at opposite ends of said loading platform and rotatably attached to said frame, and attachment means for attaching said parallel mounting means to said frame located in a position near the axle of the harvester, so that said loading platform can be alternately located above said axle or away from said axle.

16. In a harvester as defined in claim 15, said parallel mounting means further comprising an additional set of two support members rotatably connected to directly opposing portions at opposite sides of said loading platform and rotatably attached to said frame, and said attachment means being further located at substantially the same level as said axle and to the rear of said axle.

17. In a harvester as defined in claim 15, all four of said support members being parallel each to the other.

18. In a tobacco harvester, frame means for moving along a row of tobacco, support means for supporting a leafpicker adjacent the ground, elevated means for receiving tobacco leaves, transport means for transporting leaves from the leaf picker to a position at least adjacent to said elevated means, loading station means for stacking picked tobacco which can be raised and lowered and is located adjacent to said elevated means, parallel mounting means for maintaining said loading station substantially parallel to the ground when it is raised and lowered, said loading station being mounted on said frame means by said parallel mounting means, said parallel mounting means comprising a pair of support members rotatably associated with directly opposing portions at opposite sides of said loading station and rotatably associated with said frame means, and attachment means for rotatably attaching said parallel mounting means to said frame located in a position near the axle of the harvester so that said loading platform can be alternately located above said axle or away from said axle.

19. In a harvester as defined in claim 18, said parallel mounting means further comprising an additional pair of support members rotatably associated with directly opposing portions at opposite sides of said loading station and rotatably associated with said frame means, and said attachment means being further located at substantially the same level as said axle and to the rear of said axle.

20. In a tobacco harvester as defined in claim 19, all four of said support members being parallel.

21. A clip comprising first and second jaw members, toggle mounting means supporting one end of each jaw member leaving the other ends of the jaw members free to open and close, a spring having one portion thereof connected to one of said jaw members and a second portion thereof to the other jaw member and applying to each jaw member a force which is in a direction away from the other jaw member, said spring extending across the path of an object entering between the jaw members when they are open, said toggle mounting means locking said jaw members in open position when they are open and moving to a position locking the jaw members closed when the said spring is deflected by an object passing inwardly between the jaws.

22. A clip as defined in claim 21 in which the material engaging portion of each jaw member consists of a helical coil wire spring fastened at each end thereof to the jaw member.

23. A clip having two jaw members, each including a material engaging portion, the material engaging portions of the jaw members comprising helical coil wire springs which move to an adjacent parallel relation when the jaws are closed to engage the material, toggle mounting means supporting one end of each jaw member leaving the other ends free to open and close, said toggle mounting means locking said jaw members in open position when they are open and moving to a position holding the jaw members closed when the toggle mounting means is actuated, an actuating element having one position thereof connected to one of said jaw members and another portion thereof connected to the other jaw member, said actuating element extending across the path of an object entering between the jaw members when they are open and actuating said toggle mounting mechanism to holding the jaw members closed when said actuating element is deflected by another object passing inwardly between the jaws.

24. A clip as defined in claim 23 in which said actuating element is a helical coil spring.

References Cited

UNITED STATES PATENTS

| | | | |
|---|---|---|---|
| 614,689 | 11/1898 | Beauregard | 198—210 X |
| 1,761,497 | 6/1930 | Smith | 248—37 |
| 2,564,614 | 8/1951 | Sowers | 214—5.5 X |
| 2,704,158 | 3/1955 | Long | 214—5.5 |
| 2,851,297 | 9/1958 | Kelly | 294—99 |
| 3,167,190 | 1/1965 | Floyd | 214—5.5 |

GERALD M. FORLENZA, *Primary Examiner.*

MARVIN A. CHAMPION, *Examiner.*

R. G. SHERIDAN, *Assistant Examiner.*